(12) United States Patent
Ratigan

(10) Patent No.: US 9,789,937 B1
(45) Date of Patent: Oct. 17, 2017

(54) FENDER HOOK

(71) Applicant: Michael Ratigan, Elon, NC (US)

(72) Inventor: Michael Ratigan, Elon, NC (US)

( * ) Notice: Subject to any disclaimer, the term of this patent is extended or adjusted under 35 U.S.C. 154(b) by 0 days.

(21) Appl. No.: 15/056,387

(22) Filed: Feb. 29, 2016

(51) Int. Cl.
  *A47B 96/06* (2006.01)
  *B63B 59/02* (2006.01)
  *B63B 17/00* (2006.01)
  *F16B 1/00* (2006.01)
  *F16G 11/10* (2006.01)

(52) U.S. Cl.
  CPC .............. *B63B 59/02* (2013.01); *B63B 17/00* (2013.01); *F16B 1/00* (2013.01); *F16G 11/106* (2013.01); *B63B 2017/0054* (2013.01); *F16B 2001/0028* (2013.01)

(58) Field of Classification Search
  USPC ......................................................... 248/214
  See application file for complete search history.

(56) References Cited

U.S. PATENT DOCUMENTS

| | | | | |
|---|---|---|---|---|
| 1,072,556 A * | 9/1913 | Wood | ...................... | F16G 11/10 114/218 |
| 3,575,371 A * | 4/1971 | Carlstedt | ................. | B63B 21/08 24/129 B |
| 4,280,435 A * | 7/1981 | Loomis | .................... | B63B 21/04 114/219 |
| 4,895,094 A * | 1/1990 | Carlstedt | ................. | B63B 59/02 114/218 |
| 4,998,495 A * | 3/1991 | Bos | ......................... | B63B 59/02 114/218 |
| 5,048,446 A * | 9/1991 | Powell | ..................... | B63B 59/02 114/219 |
| 5,493,983 A * | 2/1996 | Hurt | ......................... | B63B 59/02 114/219 |
| 5,518,342 A * | 5/1996 | Wright | ...................... | E02B 3/26 114/219 |
| 5,701,837 A * | 12/1997 | Harvey | .................... | B63B 59/02 114/219 |
| 5,709,424 A * | 1/1998 | Schuler | .................. | B65D 63/18 294/142 |
| RE35,965 E * | 11/1998 | Cook | ....................... | B63B 21/08 114/218 |
| 5,832,857 A * | 11/1998 | McPherson | ............. | B63B 59/02 114/219 |
| 5,849,390 A * | 12/1998 | Dillon | ....................... | B60R 7/00 150/166 |
| 5,987,711 A * | 11/1999 | Parsons | ................... | B63B 21/08 114/218 |
| 6,152,060 A * | 11/2000 | Steiner | .................... | B63B 21/04 114/218 |
| 6,840,186 B1 * | 1/2005 | Steele | ...................... | F16G 11/00 114/218 |
| 6,863,011 B2 * | 3/2005 | Kinkead | ................. | B63B 59/02 114/219 |

(Continued)

*Primary Examiner* — Monica Millner
(74) *Attorney, Agent, or Firm* — Tuggle Duggins P.A.; Blake P. Hurt

(57) ABSTRACT

A fender hook is disclosed that is formed by a base material carrying a gripping material disposed between sections of hook and loop material. By wrapping the base material over upon itself, the gripping material is brought into frictional engagement with a mounting substrate such as a nautical railing and is held in place by the hook and loop material.

20 Claims, 5 Drawing Sheets

(56) References Cited

U.S. PATENT DOCUMENTS

| | | | |
|---|---|---|---|
| 7,025,012 B1 * | 4/2006 | Pecharich | B63B 21/045 |
| | | | 114/218 |
| 7,293,518 B1 * | 11/2007 | Gassew | A01K 97/10 |
| | | | 114/219 |
| D557,651 S * | 12/2007 | Gassew | D12/317 |
| D578,950 S * | 10/2008 | Gassew | D12/317 |
| D601,480 S * | 10/2009 | Beddow | D12/317 |
| 9,365,268 B1 * | 6/2016 | Paccoud | B63B 59/02 |
| 2002/0162494 A1 * | 11/2002 | Skulnick | B63B 59/02 |
| | | | 114/219 |
| 2011/0132249 A1 * | 6/2011 | Loisel, Jr. | B63B 59/02 |
| | | | 114/219 |
| 2015/0040814 A1 * | 2/2015 | Volkwein | B63B 21/08 |
| | | | 114/218 |

* cited by examiner

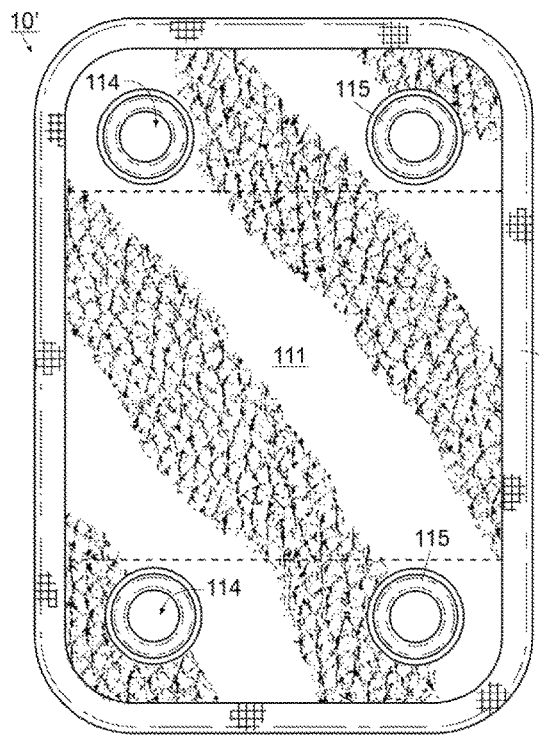 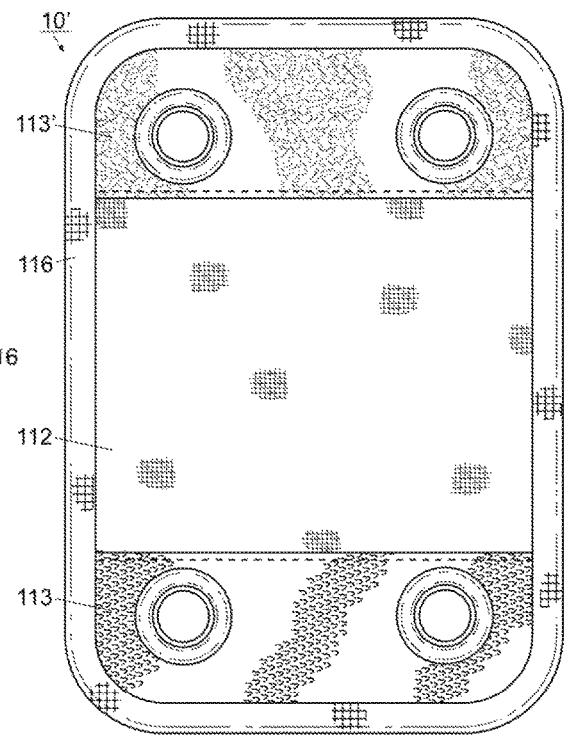
Fig. 5                    Fig. 6

FENDER HOOK

FIELD OF THE INVENTION

The invention herein pertains to marine accessories generally and particularly pertains to a fender hook with a high coefficient of friction for securely mounting nautical lines to a vessel.

DESCRIPTION OF THE PRIOR ART AND OBJECTIVES OF THE INVENTION

The use of non-abrasive members known as fenders for protecting the hulls of boats from impact and abrasion resulting from repetitive contact with a mooring substrate is known in the art. Typically a polymeric cylinder of significant diameter and length is positioned between the hull and the mooring substrate, usually a dock, as a vessel is approaching the dock. As the mooring lines are tied off, the proximity and friction imparted by both the vessel and the dock maintain the fender in position, preventing the fender from displacing from its protective position and subjecting the vessel hull to damage. However, in an effort to recover the fender when not in use, a length of rope, cord, or other nautical line is often affixed to an end of the fender, and tied off somewhere aboard the vessel. Logistically, it is disadvantageous to have nautical lines extending haphazardly about a vessel, so the preferable location to secure the fender is proximate the outer periphery of the vessel, such as an outer railing as is common on most boats. Given that most of these railings are formed from a metallic material, and further in view of the aquatic environment inherent in nautical life, it should come as no surprise that the fender cordage often becomes wet. To the extent that such cordage has a low coefficient of friction when dry, moistening the lines and then attempting to secure the fender in place is often an exercise in futility. Several fender hangers commonly known as fender hooks have been developed in an attempt to solve this issue, but low coefficient of friction continues to plague the prior art solutions, and to date inadvertent displacement of fenders resulting in impact and abrasion against the vessel hull remains a significant concern.

Thus, in view of the problems and disadvantages associated with prior art hooks, the present invention was conceived and one of its objectives is to provide a fender hook that can keep fenders in place in wet conditions.

It is another objective of the present invention to provide a fender hook that serves as an onboard, non-displaceable mounting substrate for one or more fenders.

It is still another objective of the present invention to provide a fender hook that provides a greater coefficient of friction in an aquatic environment than that exhibited by plastic, metal, or fabric.

It is yet another objective of the present invention to provide a fender hook with a length of gripping material exhibiting a coefficient of frictional greater than 3.0, according to ASTMD-1984.

It is a further objective of the present invention to provide a fender hook with a length of gripping material exhibiting a coefficient of friction greater than 3.0 when dry and when wet, according to ASTMD-1984.

It is still a further objective of the present invention to provide a fender hook with a resilient cleat configured (i.e. sized and shaped) to receive and secure a nautical line therein.

It is yet a further objective of the present invention to provide a fender hook with a gripping material as a first material, attached to a base material by a second material, whereby the first and second materials are doubled over about a railing and held in place via the line engaged between the cleat.

Various other objectives and advantages of the present invention will become apparent to those skilled in the art as a more detailed description is set forth below.

SUMMARY OF THE INVENTION

The aforesaid and other objectives are realized by providing a fender hook including a length of non-marking, aesthetically pleasing base material attached to a length of gripping material. Both the base material and the gripping material define a length sufficient to encircle the cylindrical shape of a conventional nautical safety railing. The base material defines at least one, and preferably two apertures proximate the longitudinal ends of the fender hook, each aperture sized and shaped to permit a fender line to pass therethrough. A one-way biased cleat is positioned on the opposing side of the base material relative to the gripping material, and frictionally engages the fender line such that the position of the fender may be adjusted relative to the hull of the vessel, and then securely engaged by the cleat to maintain the position and said fender.

BRIEF DESCRIPTION OF THE DRAWINGS

FIG. 5 illustrates a top plan view of an alternate embodiment of a fender hook; and FIG. 6 features a bottom plan view of the fender hook of FIG. 5.

DETAILED DESCRIPTION OF THE PREFERRED EMBODIMENT AND OPERATION OF THE INVENTION

Figure 1:
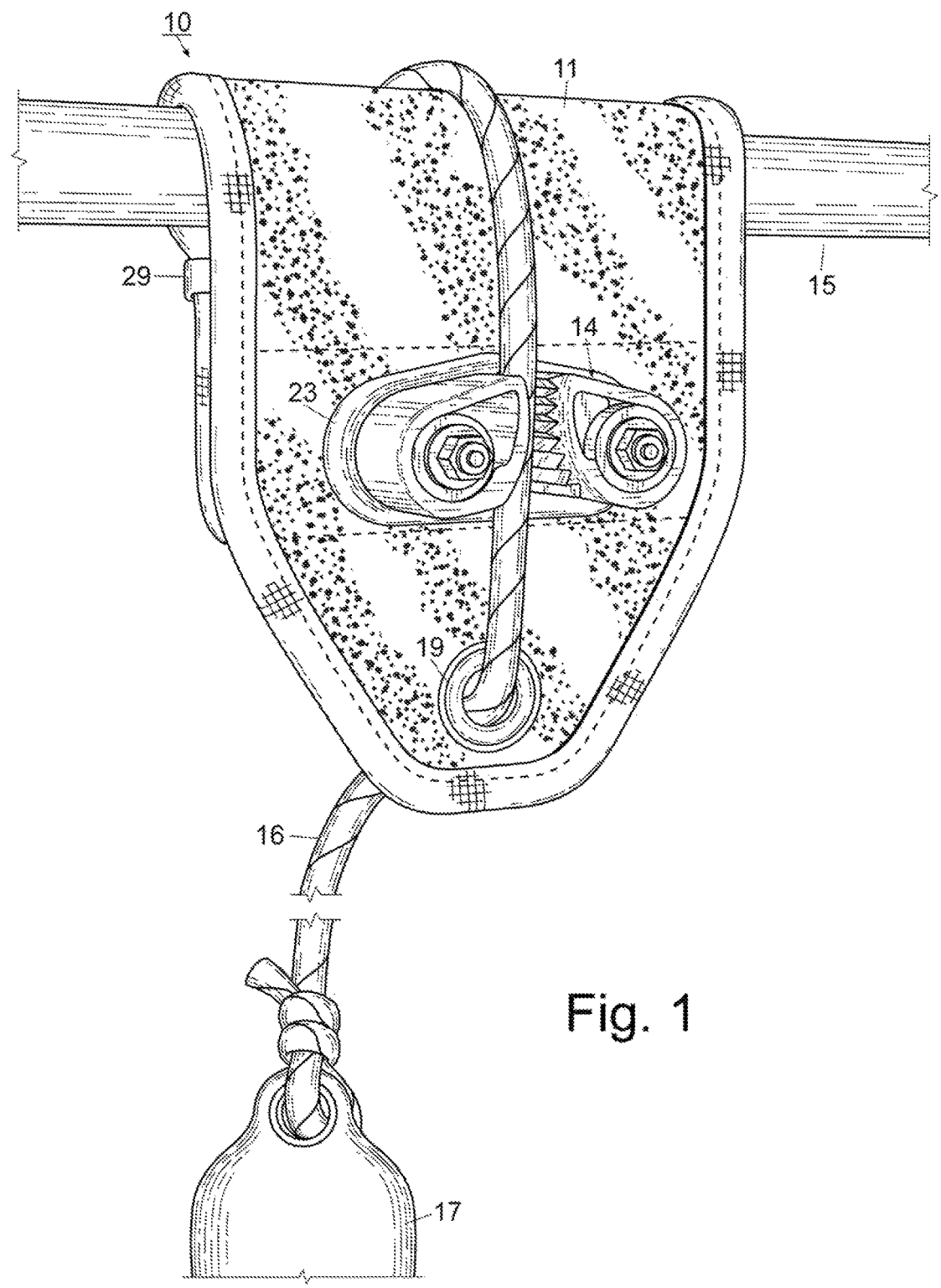
FIG. 1 shows an elevated side perspective view of the preferred embodiment of a fender hook according to the instant invention.

For a better understanding of the invention and its operation, turning now to the drawings, FIGS. 1-4 illustrate the preferred embodiment of fender hook 10 including base material 11 that serves as a mounting substrate to gripping material 12, hook and loop material 13', 13 and cleat 14. As demonstrated in FIG. 1, fender hook 10 with the components described above may be assembled and deployed about any substrate to which a user may wish to affix it to, for example railing 15 common around the periphery of nautical vessels. In use, fender hook 10 is doubled over upon itself, surrounding a substrate such as railing 15, passing through loop 29, and engaging corresponding sections of hook and loop material 13', 13. A line such as rope 16 fastened, connected, or otherwise attached to fender 17 passes through aperture 18 and within grommet 19 and is engaged with cleat 14, thereby securing the position of fender 17 relative to the surface which is being protected by fender 17, for example the hull of a nautical vessel (not shown).

Figure 2:
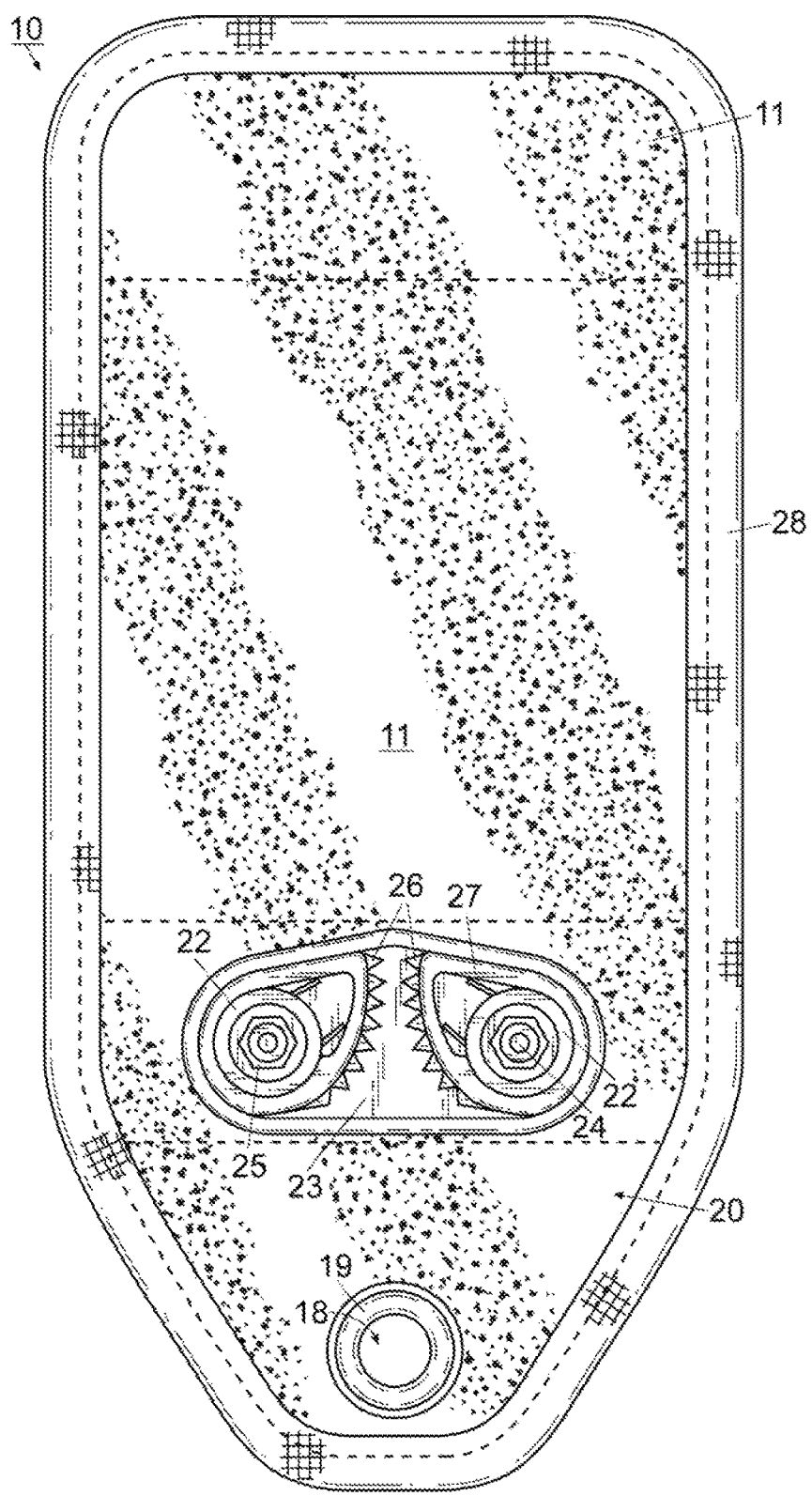
FIG. 2 pictures a top plan view of the fender hook of FIG. 1 as removed from the railing.
Figure 3:
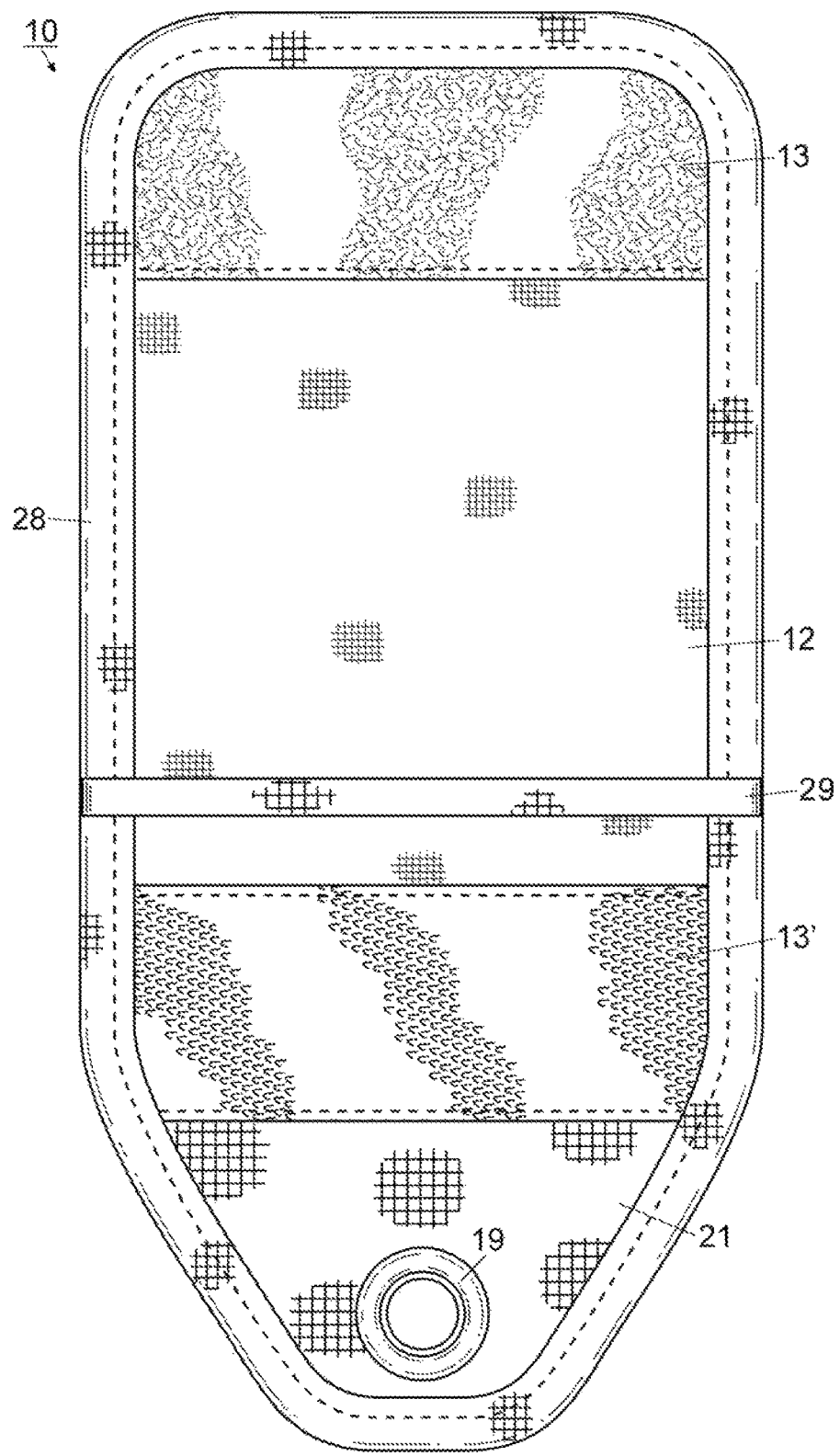
FIG. 3 depicts a bottom plan view of the fender hook of FIG. 2.
Figure 4:
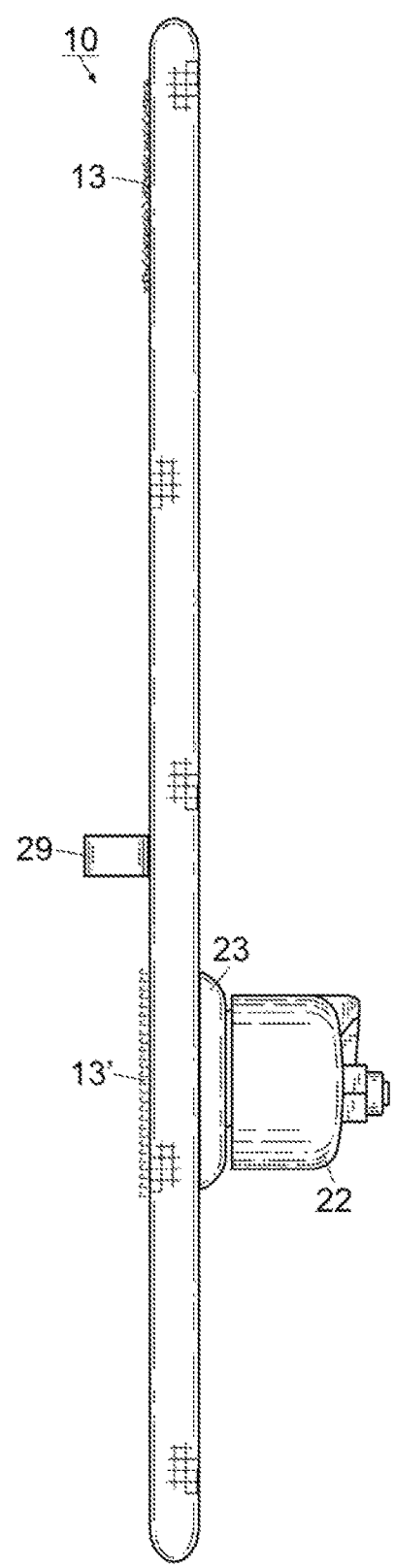
FIG. 4 demonstrates an elevated side view of the fender hook of FIG. 2.

As demonstrated in FIG. 2, base material 11 is preferably a non-marking fabric defining a somewhat rectangular shape with a length of approximately eight inches (20.32 centimeters) and a width of approximately three inches (7.62 centimeters), although other lengths, widths, and shapes are considered within the scope of the instant invention, depending on the specific needs and desires of the ultimate user. A material in the nature of sheepskin, lambskin, or supple leather, each treated with known treatments to be water repellant, is most preferred although such materials are not to be construed as a limitation on the scope of the instant invention. The shape of base material 11 should not be considered a mere design choice, as the somewhat triangular end 20 reduces the shear angle across fender hook 10 when carrying fender 17, and when coupled with reinforcement material 21 and grommet 19 circumscribing aperture 18, results in a structurally superior accessory than found in the prior art, specifically producing a surface that is more likely to remain in a planar orientation without rolling or pinching. Preferably, reinforcing material 21 is formed from a more structural, water-resistant material such as woven nylon, woven polyester, and the like. While circular aperture 18 is represented in FIGS. 1-3, it should be understood that other shapes of aperture, and corresponding shapes of grommet 19, may also be included within the purview of fender hook 10 and thus are not considered a limitation to the instant invention. Further aesthetic and structural support may be achieved by reinforcing the peripheral edges of fender hook 10 with added material in the nature of lip 28, demonstrated most prominently in FIG. 4. Formed from the same base material 11 or different material as desirable, lip 28 is folded over the outer edge of fender hook 10 and attached thereto, for example by sewing, adhesive, or the like.

Cleat 14 as shown in FIGS. 1 and 2 is preferably a biased, one-way ratchet system formed from opposingly oriented lugs 22 fastened to mounting plate 23, each lug 22 secured with threaded rod 24 and held in place with fastener 25 such as a nut. Each lug 22 preferably defines a wedge shape with a plurality of teeth 26 and is biased via biasing member 27 such as a spring. In use, cleat 14 is biased in an upward (rotational) manner, such that when rope 16 is passed within lugs 22 and pulled upwards as illustrated in FIG. 1, teeth 26 frictionally engage the exterior surface of rope 16. In the event the positioning of fender 17 need be adjusted, a user may pull rope 16, overcoming the bias of biasing members 27 and rotating lugs 22 in a counterclockwise (left lug)/clockwise (right lug) direction, releasing the frictional engagement of teeth 26 from the surface of rope 16, and permitting the unencumbered passage of rope 16. As the desired position is reached, the user releases the tension on rope 16 until teeth 26 again grip rope 16 and the bias of lugs 22 securely engages rope 16 therebetween.

Due to the aquatic nature inherent in the intended environment of preferred fender hook 10, it is highly desirable to deploy gripping material 12 on at least one surface of fender hook 10 that will frictionally engage the mounting substrate such as railing 15. Further, it is desirable to utilize a material as gripping material 12 that has a relatively high coefficient of friction while either wet or dry (i.e. at least 3.0). Preferred gripping material 12 defines a rectangular shape with a length less than that of base material 11 and is formed from a gripping material commercially available from 3M™ called 3M Gripping Material. The preferred embodiment of fender hook 10 includes a section of GM 640 3M™ Gripping Material which is formed from a thermoplastic elastomer and a polymeric knit backing. This soft material defines a hardness rating of 40 Shore A, is 33 millimeters (0.8 inches) thick and weighs 12.4 ounces per yard squared (420 g/m$^2$). This high durability material defines a dry kinetic coefficient of friction rating of 3.5 N and a wet kinetic coefficient of friction rating of 3.4 N in view of ASTMD-1894. By attaching gripping material 12 to the opposing side of base material 11, for example by sewing, adhesive, or the like, the user can wrap preferred fender hook 10 about railing 15 and frictionally engage gripping material 12 with railing 15, providing an outstanding contact grip, regardless of dry or wet conditions. Prior art fender hooks simply do not produce the level of grip in dry and wet conditions as disclosed by the instant invention. Therefore, preferred gripping material 12 defines both wet and dry coefficient of friction ratings of at least 3.0 N, regardless of the material used. It should be understood that in the preferred embodiment, base material 11 and gripping material 12 are formed from different materials, although such is not required.

While the gripping properties of gripping material 12 as described above are outstanding, it is further preferable to urge fender hook 10 in tight frictional engagement with railing 15 to ensure proper grip. Therefore, preferred fender hanger 10 further includes hook and loop material 13', 13 positioned on longitudinally opposing sides of gripping material 12 as demonstrated in FIG. 3. As would be understood, the small hooks defined within hook material 13' mechanically engage small loops defined within loop material 13 to keep fender hook 10 closed about railing 15, and thus ensure a close frictional engagement between railing 15 and gripping material 12. The use of hook and loop material 13', 13 also permits the repositioning of fender hook 10, as the releasable nature of hook and loop material 13', 13 permits repetitive engagement and disengagement as desirable. While the hook and loop engagement described above may be sufficient to keep respective ends of fender hanger 10 attached, the engagement may further be facilitated by loop 29 which further restrains separation of hook and loop material 13, 13'

An alternate embodiment of fender hook 10' including base material 111, gripping material 112, and hook and loop material 113, 113' is displayed in FIGS. 5 and 6. Although sized and shaped differently than fender hook 10, fender hook 10' seeks to accomplish the same goal as fender hook 10 but through a different attachment method with fender 17 (not shown). The plurality of apertures 114 defined in fender hook 10' proximate the respective corners of base material 111 facilitate the folding over of fender hook 10' about a mounting substrate such as railing 15, again placing gripping material in close frictional engagement therewith. An alternate embodiment may further include a structure similar to that of loop 29 to further facilitate and secure the folded-over orientation of fender hook 10' (not shown). Rope 16 can be similarly passed through one or more apertures 114 and within grommets 115, the weight of which, when coupled with the weight of one or more fenders 17, maintain the folded posture of fender hook 10'. It should be understood that the same materials of base material 11 and gripping material 12 as described above may be deployed similarly as base material 111 and gripping material 112 in fender hook 10'. Also, the same justification for lip 28 applies to the use of lip 116.

The illustrations and examples provided herein are for explanatory purposes and are not intended to limit the scope of the appended claims.

I claim:

1. A fender hook comprising a base material defining at least one aperture and first and second sides, a gripping material affixed to the first side, a hook material and a loop material each attached to the first side, the hook and loop materials opposingly oriented relative to the gripping material on the first side of the base material, whereby the gripping material is brought into contact with a mounting substrate and the hook and loop materials are brought into contact with each other when a first portion of the fender hook is folded upon a second portion of the fender hook.

2. The fender hook of claim 1 comprising a cleat positioned on the second side of the base material.

3. The fender hook of claim 2 whereby the cleat includes a lug defining a plurality of teeth.

4. The fender hook of claim 3 whereby the lug is biased via a biasing member.

5. The fender hook of claim 2 whereby the cleat includes a pair of opposingly oriented lugs, each lug defining a plurality of biased teeth.

6. The fender hook of claim 5 whereby each lug is biased via a biasing member.

7. The fender hook of claim 1 whereby the gripping material defines a coefficient of kinetic friction when dry of at least 3.0 N.

8. The fender hook of claim 1 whereby the gripping material defines a coefficient of kinetic friction when wet of at least 3.0 N.

9. The fender hook of claim 1 whereby the gripping material defines a coefficient of kinetic friction within 0.1 N when wet or dry.

10. The fender hook of claim 1 whereby the gripping material is formed from GM640 material from 3M™.

11. A fender hook comprising a base material defining first and second sides, a rectangular shape with a length and at least one aperture circumscribed by a grommet, a gripping material defining a rectangular shape with a length less than that of the base material affixed to the first side, a hook material and a loop material each attached to the first side, the hook and loop materials opposingly oriented longitudinally relative to the gripping material on the first side of the base material, whereby the gripping material is brought into contact with a railing and the hook and loop materials are brought into contact with each other when a first portion of the fender hook is folded upon a second portion of the fender hook.

12. The fender hook of claim 11 comprising a cleat positioned on the second side of the base material and in close proximity to the at least one aperture.

13. The fender hook of claim 12 whereby the cleat includes a pair of opposingly oriented lugs, each lug defining a plurality of biased teeth.

14. The fender hook of claim 13 whereby each lug is biased via a biasing member.

15. The fender hook of claim 11 whereby the gripping material defines a coefficient of kinetic friction when dry of at least 3.0 N.

16. The fender hook of claim 11 whereby the gripping material defines a coefficient of kinetic friction when wet of at least 3.0 N.

17. The fender hook of claim 11 whereby the gripping material is formed from GM640 material from 3M™.

18. The fender hook of claim 11 further comprising a lip that extends about the periphery of the fender hook.

19. The fender hook of claim 11 further comprising a portion of reinforcing material affixed to the base material positioned proximate the at least one aperture.

20. A fender hook comprising a base material defining at least one aperture and first and second sides, a gripping material defining a coefficient of kinetic friction when wet and dry of at least 3.0 N and affixed to the first side, a hook material and a loop material each attached to the first side, the hook and loop materials opposingly oriented longitudinally relative to the gripping material on the first side of the base material, whereby the gripping material is brought into contact with a mounting substrate and the hook and loop materials are brought into contact with each other when a first portion of the fender hook is folded upon a second portion of the fender hook.

\* \* \* \* \*